M. S. PRENTICE, dec'd, J. BEHEL & W. A. TALCOTT,

W. A. AMBERG, assignee, by mesne assignments, of BEHEL & TALCOTT aforesaid, and M. A. PRENTICE, administratrix of M. S. PRENTICE, dec'd.

Card File.

No. 9,646. Reissued April 12, 1881.

Witnesses.
Albert H. Adams.
B. A. Price

Inventors.
Jacob Behel.
William A. Talcott.
William A. Amberg.
Assignee.
By West & Bond
Their Attys.

N. PETERS, PHOTO-LITHOGRAPHER, WASHINGTON, D. C.

UNITED STATES PATENT OFFICE.

JACOB BEHEL AND WILLIAM A. TALCOTT, OF ROCKFORD, AND WILLIAM A. AMBERG, OF CHICAGO, ILLINOIS; SAID AMBERG ASSIGNEE, BY MESNE ASSIGNMENTS, OF BEHEL AND TALCOTT AFORESAID AND MARY A. PRENTICE, ADMINISTRATRIX OF MILES S. PRENTICE, DECEASED.

CARD-FILE.

SPECIFICATION forming part of Reissued Letters Patent No. 9,646, dated April 12, 1881.

Original No. 158,390, dated January 5, 1875. Application for reissue filed December 17, 1880.

*To all whom it may concern:*

Be it known that MILES S. PRENTICE, deceased, JACOB BEHEL, and WILLIAM A. TALCOTT, all of Rockford, in the county of Winnebago and State of Illinois, did invent a new and Improved Card-File, of which the following is a specification.

The object of our invention is to provide a file in which cards, bills, letters, or papers may conveniently be filed and readily be inspected or removed therefrom and replaced therein.

Figure 1:
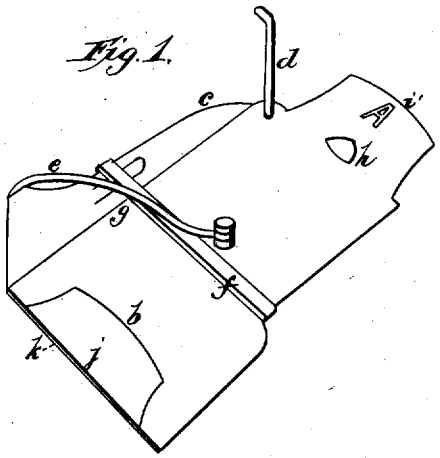
Figure 3:
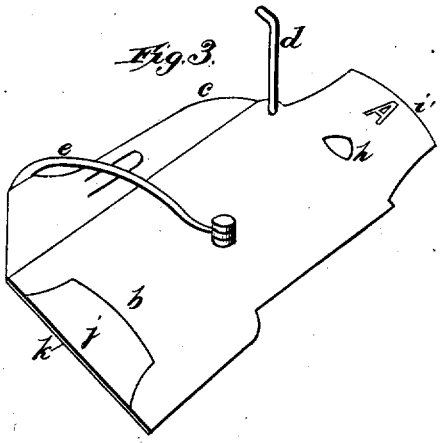
Figure 2:
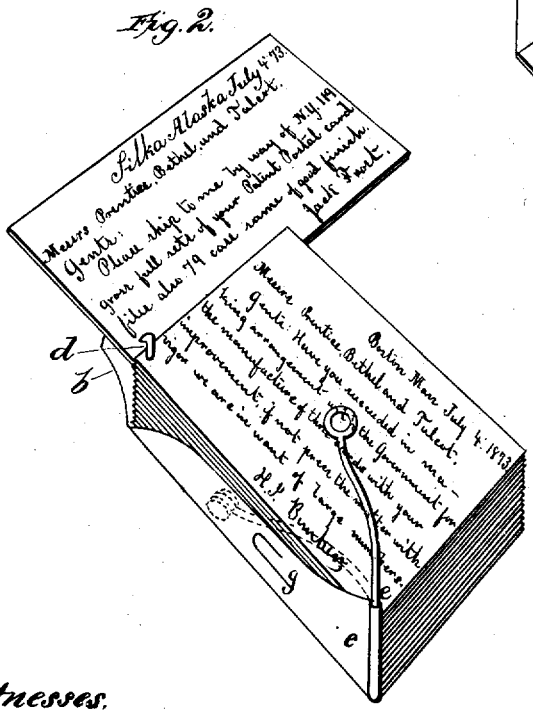

In the accompanying drawings, Figure 1 represents a view in perspective of our improved file; Fig. 2, a similar view of the same when filled with cards or papers, and Fig. 3 a perspective view with the rubber band omitted.

In order to carry out our invention in the best way now known to us, we by preference form the body of a single piece of thin sheet metal, having a flat back or bottom, *b*, and a side flange or ledge, *c*, turned up at right angles thereto. This flange forms a gage or abutment, against which one edge of the cards or papers rests. A stud, *d*, is erected on one side or corner of the back piece, *b*, near the flange *c*, and provided with a bend or hook at its upper end to retain the papers more readily. A hole is punched in one corner of the cards or papers, so that they may be strung upon this stud. A spring, *e*, is mounted on the ledge, so that it may press upon the face of the papers. By preference the end of this spring is furnished with a pad, of rubber or other equivalent material, to avoid wearing the papers. The spring is mounted to turn laterally, so as to admit of its being moved out of the way when desired. A rubber band, *f*, might be substituted for the spring *e*.

The files may be stamped or marked with letters or numbers convenient for indexing, as at A, and may be provided with holes *h*, by which to hang them up. A recess, *i*, corresponding in shape with the flange *c*, may be cut in one side, for convenience in packing, economy of material, and to enable the papers to be pushed up from below with ease.

By cutting the backs in the shape shown in Fig. 1 the head *i'* may be cut out of the foot of the file, thus leaving a space, *j*, there, and securing the utmost economy of material. The foot of the file may be strengthened by a wire, *k*, connecting the horns or points thus formed.

The operation of our file will readily be understood. The cards are strung upon the stud, swung up against the flange *c*, and clamped by the spring. Any card desired to be inspected can be swung round, as in Fig. 2, and again returned to its place without removing the others from the file.

The file-cases may be hung upon pegs or hooks or placed in suitable pigeon-holes.

We claim as our invention—

1. In combination with a card, bill, letter, or paper file body, the side swinging pressure-spring adapted to press upon the filed matter, and to be turned out of the way to relieve filed matters for inspection, substantially as specified.

2. In a file-case, the combination of a side swinging clamping or pressure spring and a card or paper retaining stud or device, substantially as and for the purpose set forth.

JACOB BEHEL.
WILLIAM A. TALCOTT.
WILLIAM A. AMBERG,
*Assignee.*

Witnesses:
S. G. BRONSON,
H. D. EASTMAN,
O. W. BOND,
A. H. ADAMS.